March 1, 1927.
J. PRICE
1,619,034
SECTIONAL CONDENSER
Filed Sept. 29, 1924     3 Sheets-Sheet 2
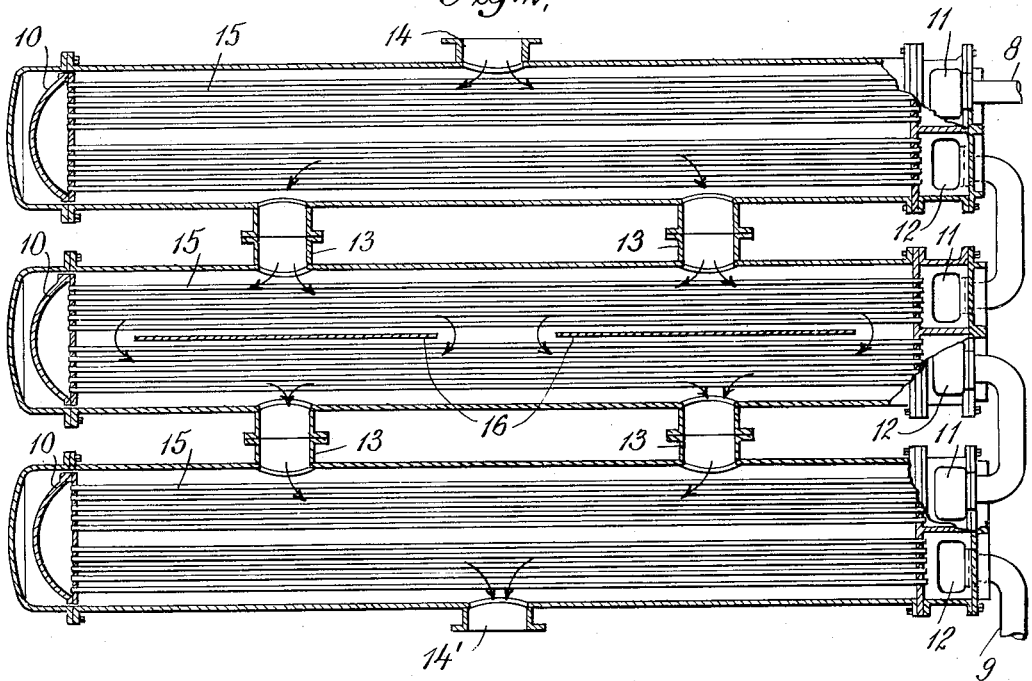
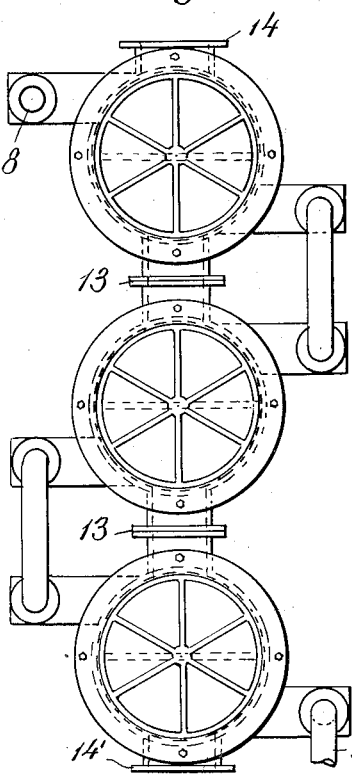
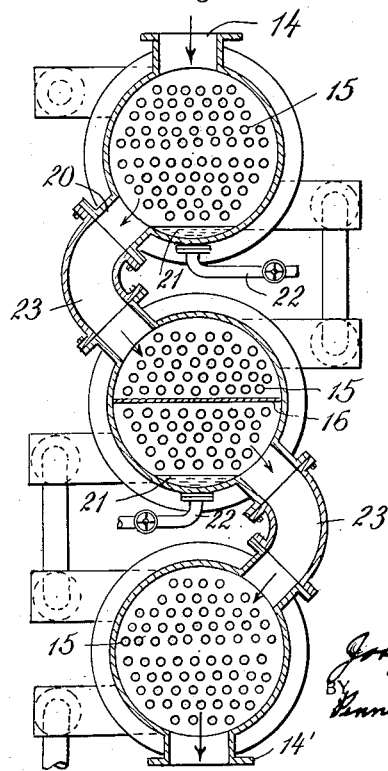
INVENTOR
Joseph Price
BY
ATTORNEY March 1, 1927. 1,619,034
J. PRICE
SECTIONAL CONDENSER
Filed Sept. 29, 1924   3 Sheets-Sheet 3

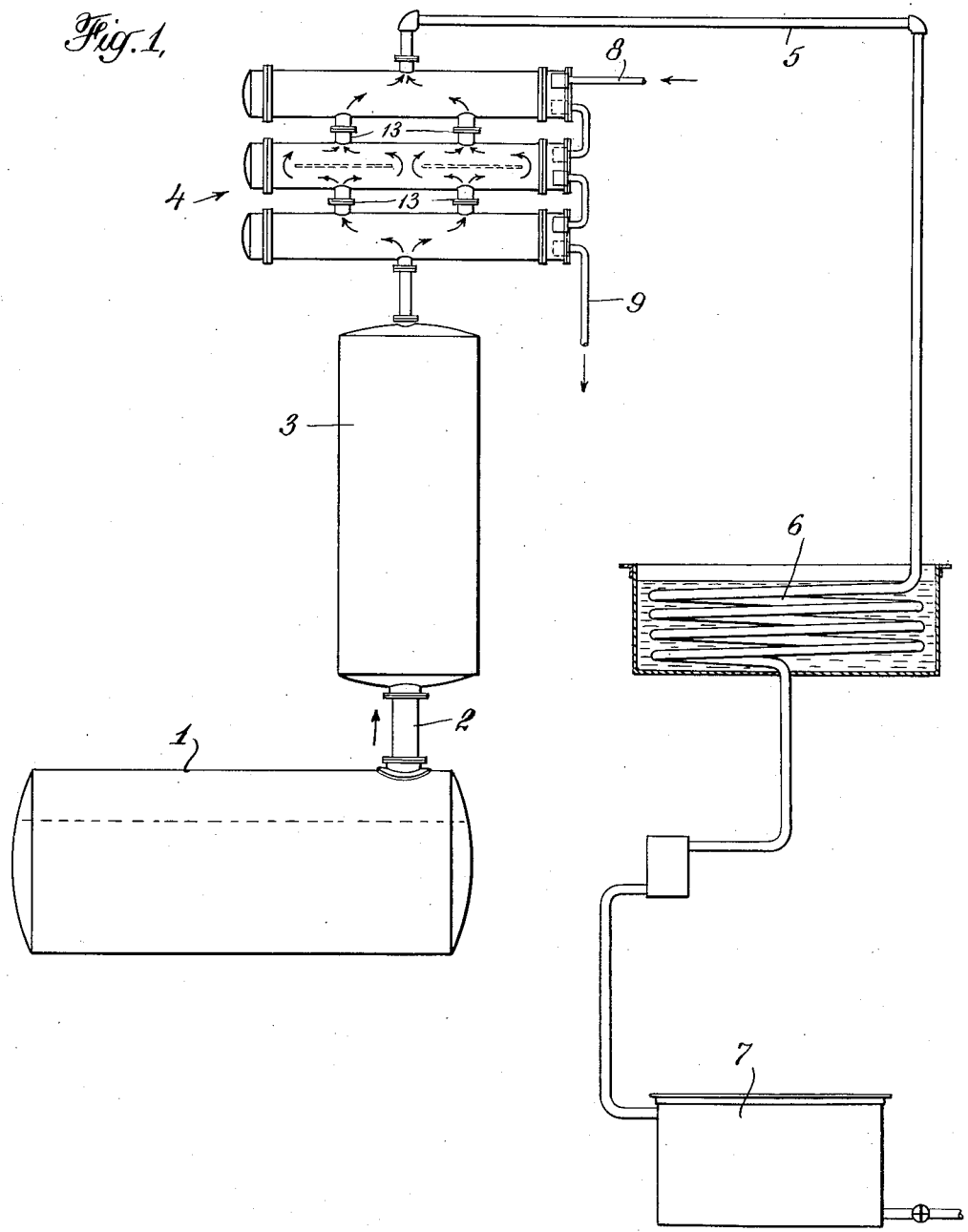

INVENTOR
Joseph Price
BY
Pennie Davis Marvin & Edmonds
ATTORNEY

Patented Mar. 1, 1927.

1,619,034

UNITED STATES PATENT OFFICE.

JOSEPH PRICE, OF NEW YORK, N. Y., ASSIGNOR TO THE GRISCOM-RUSSELL COMPANY, OF NEW YORK, N. Y., A CORPORATION OF DELAWARE.

SECTIONAL CONDENSER.

Application filed September 29, 1924. Serial No. 740,440.

The present invention relates to a heat-interchanging apparatus for effecting heat transfer between fluids and has to do particularly with an apparatus intended primarily for use in the handling of oil vapors.

Oil vapors issuing from the still are commonly at high temperatures and contain, both in the form of sensible heat and latent heat, a considerable quantity of heat which must be extracted before the distilled vapors can be reduced to liquids at suitable temperatures for storage. The vapors issuing from the still must be condensed and in the condensation of the vapors it is desirable to retain in the system as much as is possible of the available heat contained in the vapors. The vapors comprise a number of constituents of different degrees of volatility and these various constituents condense out at different temperatures. Similarly, the viscosity of the condensed liquid varies with temperature. It is therefore a matter of particular difficulty to accomplish an effective and efficient heat interchange involving oil as one or both of the heat-interchanging fluids.

It is a principal object of this invention to provide a heat-interchange apparatus which is simple in construction, easy to erect and particularly accessible for the purpose of inspection and repair into which the vapors may be directed and passed along the heat transferring surfaces of the apparatus in sustained contact with these surfaces and in such fashion that the most efficient heat transfer is obtained. In the handling of vapors and particularly in the handling of such fluids as oils wherein the viscosity of the condensate increases with lowering temperature, the velocity of flow of the heat transferring fluids along the heat-transferring surfaces is of major importance in determining the efficiency of the heat transfer. Heat transfer rates vary with the velocity of flow. In order to secure an effective heat-transfer for instance in the cooling of oil, the oil vapors and resulting condensate on the one hand must be passed along the heat-transferring tubes in close contact with the tube surfaces and at an appropriate velocity to effect proper heat interchange. Similarly, the working fluid must be passed through the tubes at a suitable velocity in order that it may absorb and conduct off the heat transferred to it from the fluid at the exterior of the tubes. The present invention contemplates the provision of a heat-interchange apparatus wherein sufficiently high velocities for efficient and effective heat interchange are obtained in a simple structure of low cost and without necessity of employing a pressure head greater than that which is originally permissible for this class of apparatus.

It is a further object of the invention to provide an apparatus of this class which consists of a plurality of sections, each of which is constructed as a separate unit and is individually accessible without necessity of disturbing the other units of the apparatus. Each of the individual units may be supplied independently with a separate source of cooling medium, if desired, or the respective units may be arranged to receive the working fluid in series arrangement. Provision is made for passing vapors and condensate between the respective units in a plurality of paths of flow for the purpose of securing the requisite velocities. These passages may also conveniently serve to support the respective condenser units in superposed relation, thus facilitating the erection of the unit.

It is a still further object of the invention to provide a sectional heat interchange apparatus of the class referred to wherein each of the individual units of the apparatus is provided with suitable baffling means to direct the fluid traversing the apparatus into sustained intimate contact with the heat-transferring tubes and at the same time to insure the passage of the fluid along the tubes at a proper velocity to secure an efficient heat interchange. The baffles in the several units are arranged with respect to each other in such fashion that a continuous flow of fluid occurs throughout all of the units of the apparatus in such fashion as to secure a proper heat interchange. The fluid passages between the respective units are so positioned with respect to the baffles of the units as to cooperate in producing the desired character of flow along the heat transferring surfaces.

It is also an object to provide an apparatus of this class designed to function as a fractional condenser and arranged in such fashion that certain of the constituents of the incoming vapors are condensed out in each of the several units of the apparatus and are collected and withdrawn from these respective units. The liquids withdrawn from the respective units are composed of constituents of different volatility.

I have illustrated a preferred embodiment of my invention in the accompanying drawings, in which—

Fig. 1 is a diagrammatic view showing a system for the distillation of oil which embodies the heat interchange apparatus of the present invention.

Fig. 2 is a vertical sectional view taken through a heat interchange apparatus embodying my invention.

Fig. 3 is an end elevational view of the apparatus of Fig. 2.

Fig. 6 is a transverse sectional view illustrating an apparatus embodying my invention which is designed for fractional condensation of the incoming vapors.

Figure 4:
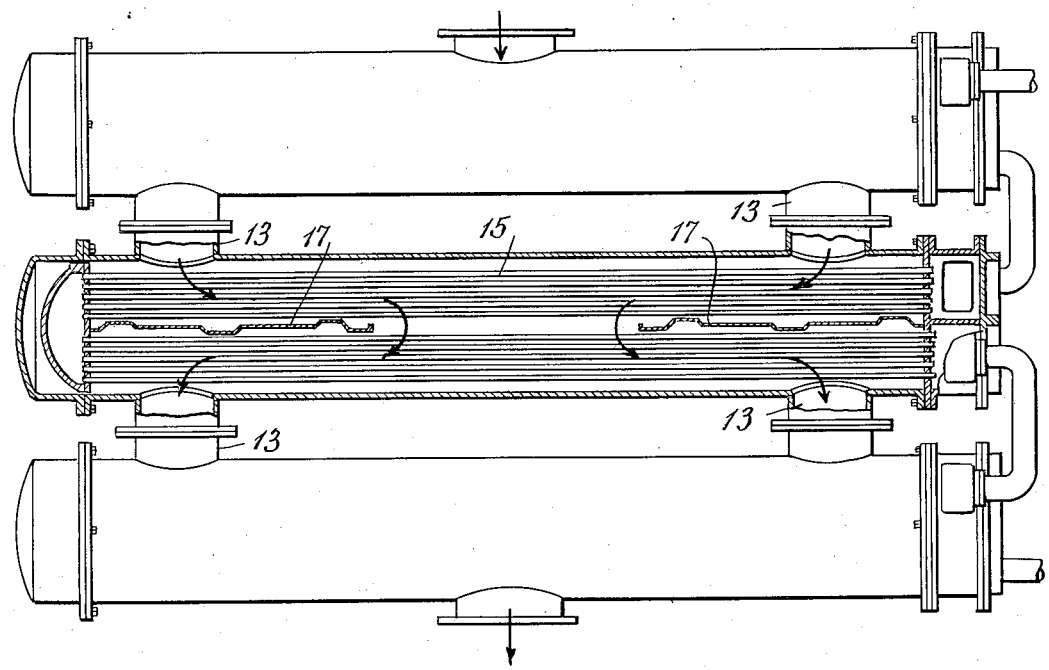
Fig. 4 is a vertical sectional view similar to Fig. 2 showing a modified form of apparatus.

Referring to the drawings, 1 indicates an oil still from whence the evolved vapors pass upward through the line 2, through the dephlegmator or fractional condenser 3 and into the sectional condenser indicated generally at 4. The vapors pass up through the several units of the sectional condenser 4 occupying the space surrounding the tubes of the units, after which the uncondensed vapors pass along line 5, through the worm or condenser 6 and from thence into the storage tank 7. The condensate which forms during the passage of the vapors through the dephlegmator 3 and sectional condenser 4 runs back under the influence of gravity and by reason of the heat from the still and the vapors issuing from the still is subjected to a further distillation. The cooling medium is supplied to the sectional condenser 4 through the line 8 and after it traverses the tubes of the respective units of the condenser it issues through the outlet line 9. The individual condenser units are provided with floating heads 10 which permit of expansion and contraction of the heating elements under changes in temperature. At the opposite ends, the condenser units are provided with headers each divided by a central partition into an inlet chamber 11 and outlet chamber 12, after the fashion indicated in Fig. 2, so that the incoming liquid enters, say one-half the tubes of the units and after traversing the length of the unit returns through the other half of the tubes.

The fluid traversing the space surrounding the tubes of the respective units passes from one condenser unit to the next through the medium of the flanged connections 13. These connections serve also as supports for maintaining each unit in position above the next lower unit. In the apparatus here shown, two such supports are provided with the result that the fluid passing from the condensing space in each unit to the next is conducted in two parallel paths as indicated by the arrows on the figures.

The construction of the sectional condenser is illustrated in detail in Fig. 2. In this apparatus the vapors are indicated as flowing downwardly through the several units instead of upwardly as shown in Fig. 1 where the condenser is used as a reflux condenser. The hot vapors enter at the inlet 14 located at the upper side of the upper unit at about the middle of its length. A discharge outlet 14' is provided on the lowermost unit. The connections 13 on the intermediate units are spaced apart and are symmetrically located at both the top and bottom of each of the intermediate units. The vapor entering through the inlet 14 circulates around in contact with the heat transferring tubes 15 of the uppermost unit from whence it passes down through the outlet openings 13 into the next lower condenser unit. This intermediate unit is provided with baffles 16 designed to deflect the vapors after the fashion indicated by the arrows and thus pass them along the heat transferring tubes in contact with the tube surfaces to thereby effect a satisfactory heat exchange. The baffles are arranged to maintain the vapors in heat-transferring relation with the tubes 15 for a material length of time and to pass the vapors along the tubes at a proper velocity for the entire time during which the vapors are in contact with the tubes. The condenser may consist of any desired number of individual units. Frequently, condensers of five or six or more units are desirable, in which case all of the intermediate units are identical and are constructed after the fashion of the intermediate units shown in Fig. 2. The upper and lower units differ from the intermediate units in that they are not provided with two openings at both top and bottom. The lowermost unit has a single opening at its under side and the uppermost unit has a single opening at its upper side. It is not ordinarily desirable or necessary to provide in these end units any particular type of baffling means for directing the flow of the fluid.

Figure 5:
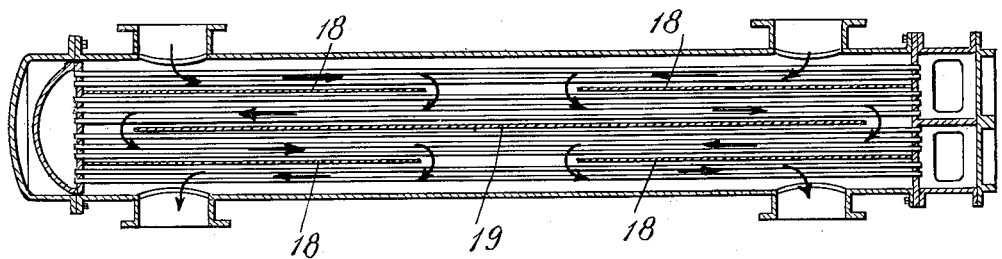
Fig. 5 is a similar view showing a still further modified form of apparatus.

The apparatus of Fig. 4 employs a somewhat different type of baffle. In this structure, the baffle plates 17 extend from each end of the condenser unit to a point near the middle of the unit. With this arrangement the incoming fluid must pass around the baffle at its end adjacent the middle of the unit. This type of baffle is of advantage in securing a sufficiently long period of contact of the vapors with the heat transferring tubes. It also serves to pass the vapors in substantial parallelism with the length of the tubes. A further development along this line is indicated in Fig. 5 wherein two baffles 18 are provided at each end of the intermediate unit and extend to a point near the middle of the length of the unit, and an additional baffle 19 is provided at about the median line of the shell and falls just short of the respective ends of the shell to thus provide a passage around its ends for the fluid traversing the unit. With this arrangement a prolonged contact of the vapors with the heat transferring tubing is secured and the flow throughout the apparatus is substantially parallel with the extent of the tubing and at the same time the fluid traverses the shell in two parallel paths with the result that proper velocities for effective heat transfer may be obtained satisfactorily.

The apparatus of Fig. 6 is designed to operate as a fractional condenser so that some of the constituents of the incoming vapors may be condensed out and collected in each of the respective units of the apparatus. In this arrangement the vapor is preferably admitted to the uppermost unit through the inlet opening 14 from whence it is circulated about in heat exchanging relation with the tubes of that unit. The discharge outlet 20 is positioned at a point somewhat above the bottom of the condenser unit so that the condensate formed may collect in the bottom of the unit as indicated at 21 and may be withdrawn through the outlet line 22. The vapors passing through the unit uncondensed pass through line 23 and enter the next lower condensing unit of the apparatus. Each of the condensing units may, as shown, be provided with outlets positioned above the bottom of the unit so that a quantity of condensate collects in each unit and may be withdrawn as desired. Since the temperatures of the units become successively lower the fractions condensed out in the respective units will be of successively lower boiling point and thus a fractional condensation of the vapors is effected.

Water may be used as a cooling medium or, as is the practice in many commercial installations, the cold oil on its way to the still is employed as a cooling medium. This latter arrangement has the advantage that the oil is preheated before entering the still and thus a lesser amount of heat need be applied to the still to effect vaporization of the oil. The units may be independently supplied with different sources of cooling medium. For instance, the initial units may, if desired, be supplied with oil on its way to the still to thus serve as a cooling medium, while the other units may be supplied with water to thus serve essentially as condenser units.

I claim—

1. Heat exchange apparatus of the class described comprising a plurality of heat interchange units including an initial unit, an intermediate unit and an end unit, arranged one above the other, heat transferring tubes in said respective units for conveying one of the heat transferring fluids, baffles in said intermediate unit extending from the ends thereof toward the middle to thereby deflect the incoming fluid toward the middle of the unit in substantial parallelism with said tubes, inlets near both ends of the units on one side of said baffles, and outlets near both ends of the units on the opposite sides of the baffles so that the incoming fluid is led through the apparatus in a plurality of parallel paths.

2. Heat exchange apparatus of the class described comprising a plurality of heat interchange units including an initial unit, an intermediate unit and an end unit, arranged one above the other, heat transferring tubes in said respective units for conveying one of the heat transferring fluids, baffles in said intermediate unit extending from the ends thereof toward the middle to thereby deflect the incoming fluid toward the middle of the unit in substantial parallelism with the extent of the said tubes, a baffle interposed between said first mentioned baffles and extending substantially throughout the length of the unit and permitting passage of fluid around its respective ends, and a plurality of inlets and outlet openings positioned near the ends of said units whereby the fluid traversing the space surrounding the tubes is conveyed in a plurality of tortuous paths in intimate and extended contact with the said tubes.

3. Heat exchange apparatus of the class described comprising a plurality of heat interchange units arranged one above the other, heat transferring tubes in said respective units for conveying one of the heat transferring fluids, a vapor inlet on the initial unit, a pair of spaced outlets on said unit, an intermediate unit having a pair of inlet openings cooperating with said spaced outlets to thereby constitute a support for the upper unit, baffles in said intermediate unit cooperating with said inlet and outlet openings for bringing said vapors into sustained contact with the heat transferring tubes in a plurality of parallel paths.

4. Heat exchange apparatus of the class described comprising a plurality of heat interchange units arranged one above the other, heat transferring tubes in said respective units for conveying one of the heat transferring fluids, a vapor inlet on the uppermost unit, a pair of spaced outlets on said unit, an intermediate unit having a pair of inlet openings cooperating with said spaced outlets to thereby constitute a support for the upper unit, baffles in said intermediate unit for deflecting the flow of vapors entering the respective inlet openings and bringing said vapors into sustained contact with the heat transferring tubes, said vapors traversing said intermediate unit in parallel paths of flow, spaced inlets in the lowermost unit for receiving the discharge from the intermediate units and a single opening at the bottom of said lowermost unit.

In testimony whereof I affix my signature.

JOSEPH PRICE.